US010190533B2

(12) United States Patent
Durrett et al.

(10) Patent No.: US 10,190,533 B2
(45) Date of Patent: Jan. 29, 2019

(54) INTERNAL COMBUSTION ENGINE AND METHOD FOR COATING INTERNAL COMBUSTION ENGINE COMPONENTS

(71) Applicant: GM GLOBAL TECHNOLOGY OPERATIONS LLC, Detroit, MI (US)

(72) Inventors: Russell P. Durrett, Bloomfield Hills, MI (US); Paul M. Najt, Bloomfield Hills, MI (US); Peter P. Andruskiewicz, IV, Ann Arbor, MI (US); Tobias A. Schaedler, Oak Park, CA (US); Gary P. Hill, Sunland, CA (US); John H. Martin, Oxnard, CA (US); Christopher J. Ro, Santa Monica, CA (US)

(73) Assignee: GM Global Technology Operations LLC, Detroit, MI (US)

(*) Notice: Subject to any disclaimer, the term of this patent is extended or adjusted under 35 U.S.C. 154(b) by 211 days.

(21) Appl. No.: 15/230,701

(22) Filed: Aug. 8, 2016

(65) Prior Publication Data
US 2018/0038308 A1    Feb. 8, 2018

(51) Int. Cl.
B22C 3/00      (2006.01)
B22D 25/02     (2006.01)
F02F 1/42      (2006.01)
B29C 39/02     (2006.01)
B29C 39/38     (2006.01)
F01L 3/04      (2006.01)
F02F 3/10      (2006.01)
F02B 77/02     (2006.01)
F02B 77/11     (2006.01)
B29L 31/30     (2006.01)

(52) U.S. Cl.
CPC ............ *F02F 1/4264* (2013.01); *B29C 39/02* (2013.01); *B29C 39/38* (2013.01); *F01L 3/04* (2013.01); *F02B 77/02* (2013.01); *F02B 77/11* (2013.01); *F02F 3/10* (2013.01); *B29L 2031/30* (2013.01); *F01L 2103/00* (2013.01); *F05C 2251/048* (2013.01)

(58) Field of Classification Search
CPC .................................. B22C 3/00; B22D 25/02
USPC .................................. 164/14, 33, 72, 138, 75
See application file for complete search history.

(56) References Cited

U.S. PATENT DOCUMENTS

| | | | | |
|---|---|---|---|---|
| 2008/0284059 A1* | 11/2008 | Merrill et al. | ...... | B32B 38/0036 264/261 |
| 2013/0052415 A1* | 2/2013 | Burns et al. | ...... | B22F 3/22 428/141 |
| 2014/0044527 A1* | 2/2014 | Parkos et al. | ...... | F04D 29/023 415/170.1 |
| 2015/0204233 A1* | 7/2015 | Nanba et al. | ...... | F02F 1/18 123/668 |
| 2017/0234216 A1* | 8/2017 | Durrett et al. | ...... | C23C 4/129 428/550 |

* cited by examiner

*Primary Examiner* — Kevin P Kerns
(74) *Attorney, Agent, or Firm* — Quinn IP Law

(57) ABSTRACT

An internal combustion engine includes a component configured to be subjected to combustion gasses, the component includes a substrate presenting a surface and a coating applied to the surface of the substrate. The coating includes an insulating layer applied to the surface having a plurality of microspheres and a sealing layer bonded to the insulating layer and seals against the insulating layer.

20 Claims, 3 Drawing Sheets

INTERNAL COMBUSTION ENGINE AND METHOD FOR COATING INTERNAL COMBUSTION ENGINE COMPONENTS

TECHNICAL FIELD

The present disclosure relates to a system and method for coating components of an internal combustion engine.

BACKGROUND

Some vehicles include an engine assembly for propulsion. The engine assembly may include an internal combustion engine and a fuel injection system. The internal combustion engine includes one or more cylinders. Each cylinder defines a combustion chamber. During operation, the internal combustion engine combusts an air/fuel mixture in the combustion chamber in order to move a piston disposed in the cylinder.

Uneven temperature distributions are established in internal combustion engines due to combustion of the air/fuel mixture, and cooling of the engine structure to maintain mechanical robustness. Coatings can be used to insulate the hot combustion gas from the cold, water-cooled engine block, to avoid energy loss by transferring heat from the combustion gas to the cooling water. Further, during the intake cycle, the coatings should cool down rapidly in order to not heat up the fuel-air mixture before ignition.

SUMMARY

An internal combustion engine and a method for coating a component of an internal combustion engine is disclosed. The internal combustion engine includes at least one component configured to be subjected to combustion gasses. The component includes a substrate presenting a surface and a coating applied to the surface of the substrate.

An insulating layer having a thickness of between about 50 microns and about 1 millimeter is applied to the surface of the substrate. The insulating layer comprises a plurality of microspheres and has a porosity of between about 80% and about 95%. A sealing layer is bonded to the insulating layer and seals against the insulating layer. The sealing layer has a thickness of between about 1 micron and about 20 microns.

The coating may include a bonding layer disposed between and bonded to the surface of the substrate and the insulating layer. The bonding layer is formed of one or more elements to balance a coefficient of thermal expansion between the substrate and the insulating layer. The insulating layer further comprises a matrix material configured to bond with the plurality of microspheres. The at least one component of the internal combustion engine may include a piston, exhaust port and/or a valve.

In one embodiment of the disclosure, a method of forming a coating for use on a component of an internal combustion engine comprises providing a template having a support surface and placing a bonding layer on the support surface. An insulating layer is applied on the bonding layer such that the bonding layer is disposed between the support surface and the insulating layer. A heating process is used to form the coating from the insulating layer, bonding layer and substrate. The coating is removed from the support surface of the template and applied to a surface of a substrate of the component.

The method may further include the step of applying the coating to the surface of the substrate by heating the coating and the surface of the substrate to promote low temperature diffusion bonding between the coating and the surface of the substrate. Alternatively, the step of applying the coating to the surface of the substrate includes applying the coating to a surface of a casting mold and casting the coating on the surface of the substrate of the component. The method may include the step of applying a release layer to the surface of the casting mold that is configured to receive the coating.

Further, the method may include the step of applying a sealing layer to the insulating layer, wherein the sealing layer is applied to a portion of the insulating layer disposed opposite the bonding layer. The heating process for the step of heating the insulating layer, bonding layer and substrate may comprise high temperature sintering. The step of placing the bonding layer on the support surface further comprises placing a metallic foil or applying a coating of the bonding layer on the support surface.

In another embodiment of the disclosure, a method of forming a coating for use on components of an internal combustion engine comprises providing a casting mold having a support surface and applying a sealing layer to the support surface of the casting mold. An insulating layer is applied to the sealing layer such that the sealing layer is disposed between the support surface and the insulating layer. A heating process is used to form the coating from the insulating layer and the sealing layer. The coating is molded to a surface of a substrate of the component to apply the coating to the surface.

The method may further comprise the step of applying a bonding layer to the insulating layer, wherein the insulating layer is disposed between the sealing layer and the bonding layer. The method may also include the step of heating the coating and the surface of the substrate to promote low temperature diffusion bonding between the coating and the surface of the substrate. Further, a release layer may be applied to the support surface of the casting mold to receive the sealing layer, wherein the release layer is disposed between the support surface of the casting mold and the sealing layer. The heating process for heating the insulating layer and sealing layer may comprise high temperature sintering.

The above features and advantages and other features and advantages of the present disclosure are readily apparent from the following detailed description of the best modes for carrying out the disclosure when taken in connection with the accompanying drawings.

DETAILED DESCRIPTION

Figure 1:
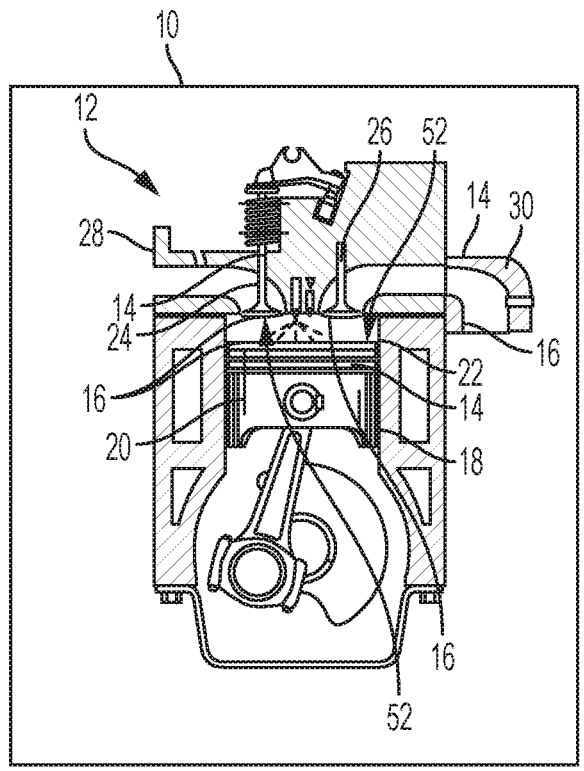
FIG. 1 is a schematic, diagrammatic view of a vehicle illustrating a side view of a single cylinder internal combustion engine having a coating disposed on one or more of a plurality of components.

Reference will now be made in detail to several embodiments of the disclosure that are illustrated in accompanying drawings. Whenever possible, the same or similar reference numerals are used in the drawings and the description to refer to the same or like parts or steps. The drawings are in simplified form and are not to precise scale. For purposes of convenience and clarity only, directional terms such as top, bottom, left, right, up, over, above, below, beneath, rear, and front, may be used with respect to the drawings. These and similar directional terms are not to be construed to limit the scope of the disclosure in any manner.

Referring to the drawings, wherein like reference numbers correspond to like or similar components throughout the several Figures, a portion of a vehicle 10 with a propulsion system 12 in accordance with an exemplary embodiment of the disclosure is shown schematically in FIG. 1. The propulsion system 12 may be any of an internal combustion engine, fuel cells, motors and the like. The propulsion system 12 may be part of the vehicle 10 that may include a motorized vehicle, such as, but not limited to, standard passenger cars, sport utility vehicles, light trucks, heavy duty vehicles, minivans, buses, transit vehicles, bicycles, robots, farm implements, sports-related equipment or any other transportation apparatus. For purposes of clarity, propulsion system 12 will be referred to hereinafter as an internal combustion engine or engine 12.

The engine 12 of vehicle 10 may include one or more components 14. The component 14 may be formed of an aluminum alloy or steel or similar material. A coating 16 may be applied to at least a surface or portion of the component 14. The coating 16, as will be described in greater detail below, may comprise a variety of configurations and physical attributes, including, but not limited to, a thermal barrier coating (TBC). In one embodiment of the disclosure, coating 16 may include a composite or multi-layer structure or configuration. While the vehicle 10 and the engine 12 of FIG. 1 are a typical example application, suitable for the coating 16 disclosed herein, the present design is not limited to vehicular and/or engine applications.

Any stationary or mobile, machine or manufacture, in which a component 14 thereof is exposed to heat may benefit from use of the present design. For illustrative consistency, the vehicle 10 and engine 12 will be described hereinafter as an example system, without limiting use of the coating 16 to such an embodiment.

FIG. 1 illustrates an engine 12 defining a single cylinder 18. However, those skilled in the art will recognize that the present disclosure may also be applied to components 14 of engines 12 having multiple cylinders 18. Each cylinder 18 defines a combustion chamber 22. The engine 12 is configured to provide energy for propulsion of the vehicle 10. The engine 12 may include but is not limited to a diesel engine or a gasoline engine. The engine 12 further includes an intake assembly 28 and an exhaust manifold 30, each in fluid communication with the combustion chamber 22. The engine 12 includes a reciprocating piston 20, slidably movable within the cylinder 18.

The combustion chamber 22 is configured for combusting an air/fuel mixture to provide energy for propulsion of the vehicle 10. Air may enter the combustion chamber 22 of the engine 12 by passing through the intake assembly 28, where airflow from the intake manifold into the combustion chamber 22 is controlled by at least one intake valve 24. Fuel is injected into the combustion chamber 22 to mix with the air, or is inducted through the intake valve(s), which provides an air/fuel mixture. The air/fuel mixture is ignited within the combustion chamber 22. Combustion of the air/fuel mixture creates exhaust gas, which exits the combustion chamber 22 and is drawn into the exhaust manifold 30. More specifically, airflow (exhaust flow) out of the combustion chamber 22 is controlled by at least one exhaust valve 26.

Figure 2:
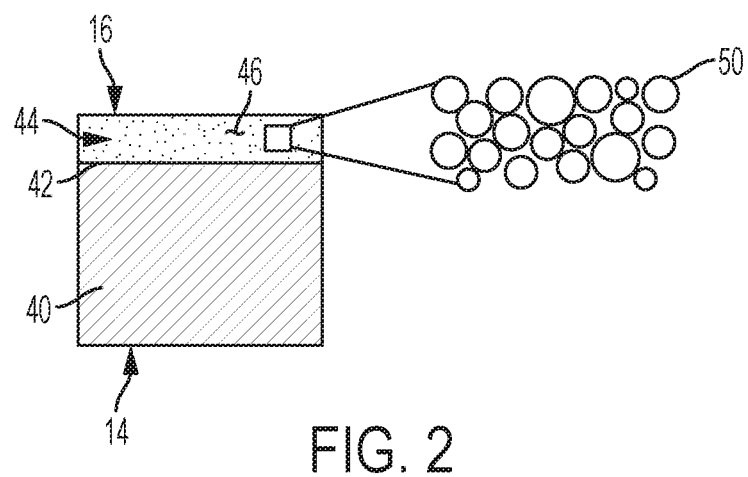
FIG. 2 is a schematic cross-sectional side view of a coating disposed on the component.

With reference to FIGS. 1 and 2, the coating 16 may be disposed on a face or surface of one or more of the components 14 of the engine 12, including, but not limited to, the piston 20, the intake valve 24, exhaust valve 26, interior walls of the exhaust port or manifold 30, and the like. In one embodiment of the disclosure, the coating 16 may be applied onto high temperature sections or components 14 of the engine 12 and bonded to the component 14 to form an insulator configured to reduce heat transfer losses, increase efficiency, and increase exhaust gas temperature during operation of the engine 12.

The coating 16 is configured to provide low thermal conductivity and low heat capacity to increase engine efficiency. As such, the low thermal conductivity reduces heat transfer losses and the low heat capacity means that the surface of the coating 16 tracks with the temperature of the gas during temperature swings and heating of cool air entering the cylinder is minimized and enable pistons and exhaust ports that are coated with the coating 16 that provides low thermal conductivity and low heat capacity, while fulfilling requirements of high temperature capability and structural integrity. Furthermore this invention discloses methods for applying such a coating system. Such a coating is desired for minimizing heat loss in internal combustion engines to increase engine efficiency.

In one non-limiting embodiment of the disclosure, the coating 16 may be about 50 microns or micrometers (μall) to about 1000 μm in thickness that is applied to a presenting surface 42 of the component 14 which exhibits a calculated thermal conductivity of about 0.09 W/mK and heat capacity of 240 kJ/m³K to minimize heat losses and increase engine efficiency. It should be appreciated that the coating 16 may be separately applied to components other than present within the engine 12. Further, it should be appreciated that the coating 16 may be applied to components other than present within the engine 12, such as components of spacecraft, rockets, injection molds, and the like.

Figure 3A:
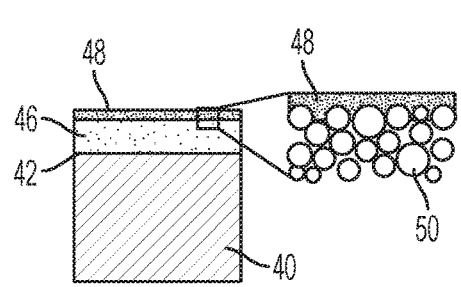
FIGS. 3A-3B are schematic cross-sectional side views of bonded microspheres of the coating as applied to a substrate of the component.
Figure 3B:
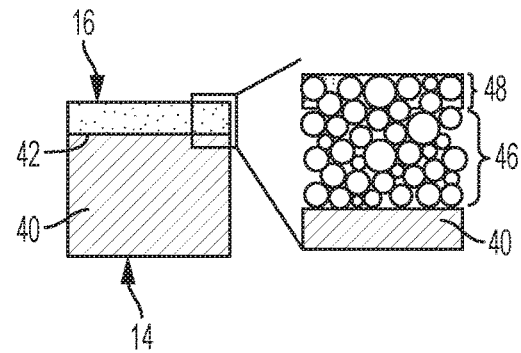

Referring now to FIG. 2, each component 14 includes a substrate 40 having at least one exterior or presenting surface 42. The coating 16 may include at least one layer 44 that is applied and/or bonded to the surface 42 of the substrate 40. As is shown in FIGS. 3A and 3B, the at least one layer 44 of the coating 16 may include multiple layers, such as a first or insulating layer 46, a second or sealing layer 48 and/or a third or bonding layer 49.

In one embodiment of the disclosure, the sealing layer 48 may be a thin capping layer that prevents combustion residue from entering the insulating layer 46 and fills open porosity of a plurality of microspheres 50 of the insulating layer. Bonding layer 49 may be used to promote adhesion of the insulating layer 46 to the surface 42 of the substrate 40. Additionally, as described in greater detail below, the bonding layer 49 may include one or more elements to balance the coefficient of thermal expansion (CTE) between the substrate 40 and the insulating layer 46.

The insulating layer 46 may include a plurality of microspheres 50 sintered together to create a layer having an extremely high porosity and closed cell structure. Preferably, the porosity of the insulating layer 46 may be at least about 80% and, more particularly, a porosity of between about 80% and about 95%. The high porosity of the insulating layer 46 provides for a corresponding volume of air and/or gases to be contained therein, thus providing the desired insulating properties of low effective thermal conductivity and low effective heat capacity.

It is contemplated that the higher the volume fraction of porosity in the insulating layer 46, the lower the thermal conductivity and capacity. The porosity level needs to be balanced with the mechanical requirements, such as compressive strength, which is required to withstand the high pressure levels in the engine 12. The thickness of the insulating layer 46 may be between about 100 μm and about 500 μm and, more particularly, about 200 μm. The thickness of the sealing layer 48 may be between about 1 μm and about 20 μm and, more particularly, about 5 μm. The insulating layer 46 is configured to withstand surface temperatures of at least 1,000 degrees Celsius (° C.).

The microspheres 50 may be comprised of a combination of polymeric, metal, glass, and/or ceramic materials. In one non-limiting embodiment, the microspheres 50 may be comprised of metal, such as nickel (Ni), nickel alloy compounds, iron-chromium-aluminum (FeCrAl) alloys, cobalt (Co) alloys and the like for durability and resistant to oxidation and corrosion at high temperatures of at least 1,000 degrees Celsius (° C.). The microspheres 50 may have a diameter of between about 10 microns or micrometers (μm) and about 100 μm. The microspheres are hollow, with a shell thickness that is about 1% to about 10% of the diameter.

In another non-limiting embodiment, the microspheres 50 are formed using ceramics such as glass bubbles or cenospheres such as Finite® and the like for durability and resistant to oxidation and corrosion at high temperatures. The microspheres 50 may have a diameter of between about 10 microns or micrometers (μm) and about 100 μm, a shell thickness that is about 2% to about 5% of the diameter of the microsphere 50 and a hollow interior.

The ceramic microspheres 50 may comprise about 50 percent by weight to about 90 percent by weight of silicon oxide ($SiO_2$) and about 10 percent by weight to about 50 percent by weight of aluminum oxide ($Al_2O_3$). Alternatively, the plurality of cenosphere microspheres may comprise about 50 percent by weight to about 70 percent by weight of silicon oxide and about 30 percent by weight to about 50 percent by weight of aluminum oxide to achieve a higher melting point.

It is understood that a ceramic insulating layer 46 has lower thermal conductivity. However, ceramics have lower CTE than most commonly used alloys. Alternatively, aluminum oxide, silicon oxide or other oxides or ceramics may be used to form microspheres 50.

The microspheres 50 may be sorted by one or more physical factors, such as by size or density, to achieve a targeted size distribution. In one non-limiting embodiment, an average diameter of a microsphere 50 would be about one-fourth of the thickness of the insulating layer 46, though it is understood that the microsphere 50 diameter would be smaller for a thinner insulating layer 46. For example, microspheres 50 may be sorted and selected having a diameter of about 10 microns to about 50 microns.

Referring now to FIGS. 3A and 3B, the sealing layer 48 is disposed over the insulating layer 46, such that the insulating layer 46 is disposed between the sealing layer 48 and the bonding layer 49. The sealing layer 48 may be a high temperature thin film. More specifically, the sealing layer 48 comprises material that is configured to withstand temperatures of at least 1,100 degrees Celsius (° C.). The sealing layer 48 may be configured to be a thickness of about 1 μm to about 20 μm, and, more particularly, no greater than about 5 μm.

The sealing layer 48 may be non-permeable to combustion gases, such that a seal is provided between the sealing layer 48 and the insulating layer 46. The sealing layer 48 may prevent debris from combustion gases, such as unburned hydrocarbons, soot, partially reacted fuel, liquid fuel, and the like, from entering the porous structure defined by the microspheres 50. If such debris were allowed to enter the porous structure of the insulating layer 46, air disposed in the porous structure would end up being displaced by the debris, and the insulating properties of the insulating layer 46 would be reduced or eliminated.

The sealing layer 48 may be configured to present an outer surface 52 that is smooth. A smooth sealing layer 48 may be important to prevent the creation of turbulent airflow as the air flows across the outer surface 52 of the sealing layer 48. Further, having a sealing layer 48 with a smooth surface will prevent an increased heat transfer coefficient. In one non-limiting example, the sealing layer 48 may be applied to the insulating layer 46 via electroplating. In another non-limiting example, the sealing layer 48 may be applied to the insulating layer 46 simultaneously with sintering the insulating layer 46.

In one embodiment, the sealing layer 48 may be applied to an insulating layer 46 with metallic microspheres 50, wherein the sealing layer 48 may be a foil of a thickness of about 2 μm to about 20 μm formed from one or more of a nickel base super alloy, Inconel® alloy, stainless steel or similar oxidation and corrosion resistant alloys. In another embodiment, the sealing layer 48 may be applied to an insulating layer 46 with metallic microspheres 50, wherein the sealing layer 48 may be a thickness of about 2 μm to about 20 μm formed by electroplating or vapor phase depositing one or more of nickel, cobalt, chromium or iron or a combination of elements electroplated onto the insulating layer 46, such as Nickel (Ni), Zinc (Zn), Iron (Fe), Chromium (Cr) Molybdenum (Mo), Tungsten (W), Manganese (Mn) or Copper (Cu).

In yet another embodiment, the sealing layer 48 may be applied to an insulating layer 46 with metallic microspheres 50, wherein the sealing layer 48 may be a thickness of about 2 μm to about 50 μm where the volume between the microspheres 50 is filled with matrix material, such as melt infiltrated metal alloy, infiltrated metal slurry, chemical vapor deposition (CVD), physical vapor deposition (PVD) or plated metal. In still yet another embodiment, the sealing layer 48 may be applied to an insulating layer 46 with ceramic microspheres 50, wherein the sealing layer 48 may be a foil of a thickness of about 2 μm to about 20 μm formed of at least one of an aluminum metal or aluminum alloy foil that is subsequently oxidized to an oxide layer.

In another embodiment, the sealing layer 48 may be applied to an insulating layer 46 with ceramic microspheres 50, wherein the sealing layer 48 may be a thickness of about 2 μm to about 20 μm formed of ceramic adhesives that form a ceramic on heat treatment. In yet another embodiment, the sealing layer 48 may be applied to an insulating layer 46 with ceramic microspheres 50, wherein the sealing layer 48 may be a thickness of about 2 μm to about 20 μm formed of a coating comprised of preceramic precursors including siloxanes, silanes, carbosilanes, silazanes, borosilanes and similar molecules and mixtures thereof, that are subsequently crosslinked by thermal or UV cure and then pyrolyzed in an inert atmosphere to a dense ceramic layer. In another embodiment, the sealing layer 48 may be applied to an insulating layer 46 with ceramic microspheres 50, wherein the sealing layer 48 may be a thickness of about 2 μm to about 20 μm formed of a dense matrix comprising a ceramic infiltrated into the open porosity, including aluminum metal or aluminum alloy that is subsequently oxidized, ceramic adhesives, preceramic precursors.

The sealing layer 48 may be configured to be sufficiently resilient so as to resist fracturing or cracking during exposure to debris. Further, the sealing layer 48 is configured to be sufficiently resilient so as to withstand any expansion and/or contraction of the underlying insulating layer 46. Further, the insulating and sealing layers 46, 48 are each configured to have compatible coefficient of thermal expansion characteristics to withstand thermal fatigue.

In another embodiment of the disclosure, microspheres 50 may be combined with particles of a matrix forming alloy to seal the insulating layer 46. The matrix may be used in connection with the sealing layer 48 or may be used in the insulating layer 46 in place of the sealing layer 48. The particles may be of a composition that melts or sinters at a lower temperature than the microspheres 50 to fuse adjacent microspheres 50 together and with the surface 42 of the substrate 40 with the matrix without deforming or damaging the microspheres 50. If the melting point of the particles is below about 1,000 degrees Celsius (° C.), a potential surface temperature of a component 14 in an internal combustion engine 12 using an insulating coating 16, particles may alloy with either the microspheres 50 or another material to form the matrix with a melting point greater than 1,000 degrees Celsius (° C.).

The particles may comprise a metal, such as aluminum or an aluminum alloy, which melts at a temperature below 1,000 degrees Celsius (° C.) to fuse the microspheres 50 and convert by oxidation to an aluminum oxide. Alternatively, the particles may comprise a metal nitrate or metal alkoxide precursor, such as aluminum nitrate or titanium isopropoxide or tetraethyl orthosilicate, that may be pyrolyzed to an oxide, for example aluminum oxide or titanium oxide or silicon oxide. In this embodiment, microspheres 50 are mixed with a solution of the metal nitrate or alkoxide precursor or with the pure precursor.

In yet another alternative embodiment, particles may comprise a preceramic polymer such as siloxanes, silanes, carbosilanes, silazanes, borosilanes and similar molecules that are pyrolyzed to an oxide. It is contemplated that a size distribution of particles for use in matrix may be defined. In one embodiment, any particles that are less than about one-tenth of the thickness of the coating or greater than about one-third of the coating thickness may be excluded from the matrix to ensure the structural durability and robustness of the matrix by avoiding large interstices between microspheres 50.

Figure 4A:
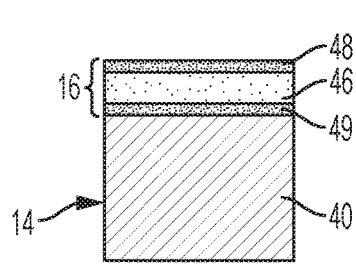
FIGS. 4A-4B are schematic cross-sectional side views of the coating applied to the substrate of the component.
Figure 4B:
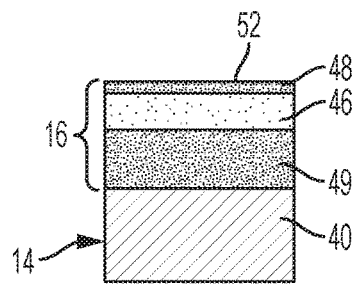

Referring to FIGS. 4A and 4B, the third or bonding layer 49 may be disposed between and configured to bond to the surface 42 of the substrate 40 and to the insulating layer 46, such that the insulating layer 46 is attached to the substrate 40. In one non-limiting embodiment, the bonding layer 49 is configured to diffuse into the surface 42 of the substrate 40 and into the insulating layer 46 to form bonds therebetween.

In one non-limiting embodiment, the substrate 40 comprises aluminum. The bonding layer 49 may comprise one or more elements from the group consisting of: alumina forming nickel alloy, alumina forming steel, chromium, brass and iron nickel alloy to balance the coefficient of thermal expansion between the substrate 40 and the insulating layer 46. It should be appreciated, however, that the substrate 40 and bonding layer 49 are not limited to the named materials and may comprise other materials.

In another embodiment, bonding layer 49 may include a low CTE coating of iron with about 30% by weight to about 45% by weight nickel or Invar® whereby up to about 10% of the nickel and about 10% of the iron can be replaced by cobalt or Kovar® and applied with a thickness of about 0.5 mm to about 3 mm to transition the CTE between the substrate 40 of aluminum or steel and the CTE of a metallic or a ceramic microsphere. In yet another embodiment, bonding layer 49 may include a nickel alloy coating with about 20% by weight to about 40% by weight and about 7% by weight to about 15% by weight of aluminum and applied with a thickness of about 0.5 mm to about 3 mm to transition the CTE between the substrate 40 of aluminum or steel and the CTE of a metallic or a ceramic microsphere.

The bonding layer 49 may be disposed across the surface 42 of the substrate 40, and the insulting layer 46 is disposed across one side of the bonding layer 49, such that the bonding layer 49 is disposed between the substrate 40 and the insulating layer 46. A compressive force may be applied to the insulating layer 46 and the substrate 40, at a bonding temperature, for at least a minimum apply time. In one embodiment of the disclosure, the bonding layer 49 may be formed of a material such as Inconel® or the like applied to mitigate a difference in CTE between the substrate 40 and insulating layer 46 and reduce the energy release rate of the coating 16.

The melting temperature of the material of the bonding layer 49 may be less than the melting temperature of each of the substrate 40 and the material of the insulating layer 46. Further, the required bonding temperature may be less than the melting temperature of the material of the substrate 40 and the material of the insulating layer 46, but sufficiently high enough to encourage diffusion to occur between the substrate 40 and each of the bonding layer 49 and the insulating layer 46.

It should be appreciated that the bonding layer 49 may be applied to the insulating layer 46 prior to bonding the bonding layer 49 to the surface 42 of the substrate 40. Additionally, the bonding layer 49 is not limited to being bonded to the surface 42 of the substrate 40 and/or the insulating layer 46 with diffusion, as other methods of adhesion may also be used, such as by wetting. The sealing layer 48 is disposed over the insulating layer 46, such that the insulating layer 46 is disposed between the sealing layer 48 and the bonding layer 49.

In one embodiment of the disclosure, the insulating layer 46 may be formed by applying a slurry of the microspheres 50, to the bonding layer 49 and, in another embodiment, to the surface 42 of substrate 40 of the component 14. The insulating layer 46 may be applied as a spray coating to the bonding layer 49 via a pressurized spray gun that is adjusted to distribute a uniform coating of insulating layer 46 onto the bonding layer 49. Alternatively, the insulating layer 46 may be blade coated or doctor bladed on the bonding layer 49 and thereby sintered.

In another embodiment, the insulating layer 46 is applied to the bonding layer 49 and/or the surface 42 of substrate 40, dried and heat treated to pyrolyze the precursor into an oxide. In yet another embodiment, preceramic monomers may be mixed with a solvent to create a liquid that can be mixed with the microspheres 50. This slurry can then be applied as a coating to the bonding layer 49. After letting the solvent evaporate, the monomer/microsphere coating is then cured, either by UV light exposure or by thermal annealing. The curing crosslinks the monomers and forms a rigid polymer matrix. This polymer matrix is then pyrolyzed in air or inert atmosphere to a ceramic, for example 1,000 degrees Celsius (° C.) in argon, exact pyrolysis conditions depend on the preceramic polymer.

A method for applying a coating 16 to a surface 42 of a substrate 40 of a component 14 is described in greater detail. The method includes providing a plurality of microspheres, such as ceramic or metallic microspheres. In one embodiment of the disclosure, the plurality of microspheres include ceramic microspheres that may be sorted such that ceramic microspheres having a diameter of about 10 microns to about 100 microns, preferably about 10 microns to about 50 microns, are selected for use.

Particles of the matrix may be added to the selected microspheres 50. Particles may include a variety of mixtures and may be added at a weight fraction of about 5% by weight to about 50% by weight of the microspheres 50. In one embodiment, the matrix mixture may include boron oxide and about 0% by weight to about 50% by weight of aluminum oxide. In another embodiment, matrix mixture may include a borosilicate glass. In yet another embodiment, the matrix mixture may include an aluminum metal or an aluminum alloy, which is melted to fuse the microspheres 50 together and subsequently oxidized to an oxide matrix.

In yet another embodiment, the matrix mixture may include silica precursors including tetraethyl orthosilicate, which fuses the microspheres 50 together and is subsequently pyrolyzed to an oxide matrix. In another embodiment, the matrix mixture may include preceramic precursors including siloxanes, silanes, carbosilanes, silazanes, borosilanes and similar molecules and mixtures thereof, that are subsequently crosslinked by thermal or UV cure and then pyrolyzed in an inert atmosphere to a ceramic matrix.

It is contemplated that the plurality of ceramic microspheres 50 may be applied to the surface 42 of the substrate 40. Alternatively, a slurry may be prepared with the plurality of ceramic microspheres 50, matrix and at least one of a solvent and a binder as described above. The slurry is applied to the surface 42 of the substrate 40 of the component 14 using a process, including, but not limited to, spraying, dipping, powder placement, painting and doctor-blading. At least one heat treatment is applied to the slurry and the surface 42 of the component 14. The at least one heat treatment may include drying the slurry and surface 42 of component 14 in an oven at about 125 degrees Celsius (° C.) and subsequently sintering the slurry and component 14 in air at about 725 degrees Celsius (° C.) for 2 hours. A non-permeable sealing layer 48 may be bonded to the slurry such that the non-permeable sealing layer 48 seals against the slurry.

Referring now to FIGS. 5A-5D, at least one method of applying the coating 16 to one or more components 14 of a propulsion system, such as the engine 12 is described in greater detail. As discussed above, applications of the insulating layer 46, sealing layer 48 and/or bonding layer 49 of the coating 16 may be accomplished through spray coating, doctor blading, dip coating and the like to surfaces with complex features, such as a piston or exhaust valve of a propulsion system.

Figure 5A:
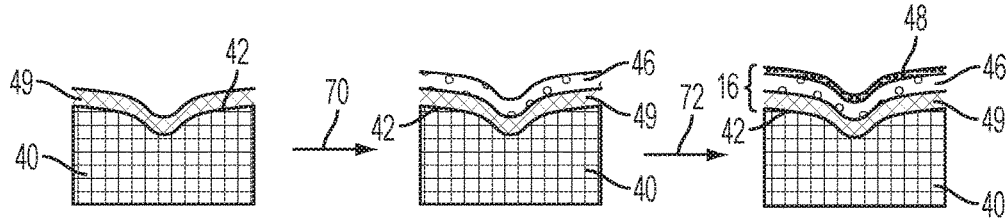
FIGS. 5A-5D are schematic cross-sectional side views of methods of coating a component of an internal combustion engine in accordance with this disclosure.

Referring now to FIG. 5A, a method of applying the coating 16 to the component 14 includes providing a substrate 40 having a presenting or support surface 42. In one embodiment of the disclosure, a bonding layer 49 may be placed on the support surface 42 and disposed to receive the plurality of microspheres 50 that will form the insulating layer 46 thereon. Alternatively, the plurality of microspheres 50 may be applied directly to the support surface 42 of the substrate 40 to create the insulating layer 46 without the use of the bonding layer 49 as generally represented by arrow and reference numeral 70. In yet another alternative embodiment, a slurry containing the plurality of microspheres 50 may be applied to the bonding layer 49 and be subjected to a heating process, such as a sintering heat treatment, to form a pre-cured coating of the insulating layer 46, also generally represented by arrow and reference numeral 70.

A sealing layer 48 may then be applied to the insulating layer 46 to seal the porosity in the insulating layer 46 as generally represented by arrow and reference numeral 72. It is contemplated that the sealing layer 48 may be applied to the insulating layer 46 prior to application of the heating process to be sintered with the insulating layer 46 or may applied after sintering of the insulating layer 46.

Figure 5B:
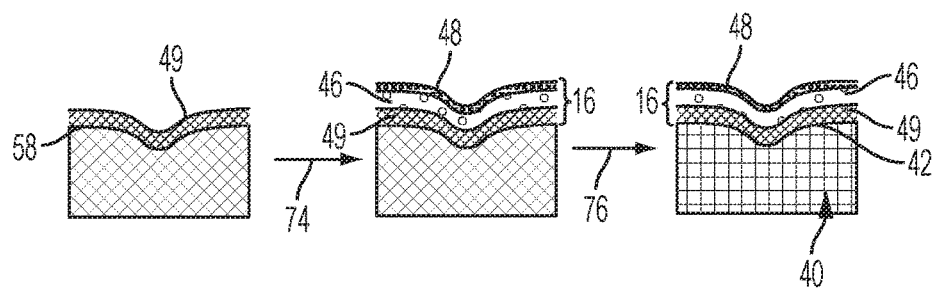

Referring to FIG. 5B, another method of applying the coating 16 to a component 14 of the propulsion system is described. The bonding layer 49 may be applied to a support surface 48 of a template. The bonding layer 49 may be deposited on the support surface 58 by coating the support surface 48 or may be a preformed metallic foil layer applied thereon. It is contemplated that support surface 58 may have similar dimensions and geometry to the surface 42 of the substrate 40, though distinct dimensions and geometries may also be contemplated.

The plurality of microspheres 50 of the insulating layer 46 may be applied to the bonding layer 49 on the support surface 58 of the template using one or more of the processes described above and as generally referenced by arrow and reference numeral 74. A first heating process, such as high temperature sintering, may be applied to the insulating layer 46 disposed on the bonding layer 49 to bond the insulating layer 46 with the bonding layer 49.

The insulating layer 46 and bonding layer 49 may be removed from the support surface 58 and placed on the surface 42 of the substrate 40. A second heating process is applied to form the coating 16. The second heating process, generally referenced by arrow and reference numeral 76, bonds the insulating layer 46 and bonding layer 49 at low temperatures via low temperature diffusion bonding to adhere the layers of the coating 16 to the surface 42 of the substrate 40 of the component 14. It is contemplated that the second heating process may also include the use of bonding aids, such as brazing or the like.

Sealing layer 48 may then be applied to the insulating layer 46 to seal the porosity in the insulating layer 46. It is contemplated that the sealing layer 48 may be applied to the insulating layer 46 prior to application of the first heating process to be sintered with the insulating layer 46 and bonding layer 49 or may applied after sintering of the insulating layer 46 and bonding layer 49.

Figure 5C:
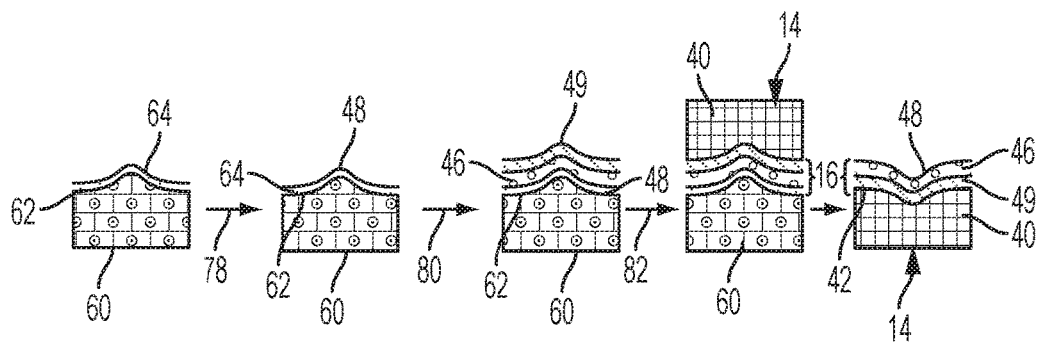

Referring to FIG. 5C, yet another method of applying the coating 16 to a component 14 of the internal combustion engine 12 is described. A casting mold 60 is provided to receive one or more elements of the coating 16. A release layer or coating 64 may be placed on a support surface 62 of the casting mold 60 to receive the sealing layer 48. It is understood that the release layer 64 may receive the sealing layer as generally referenced by arrow and reference numeral 78, or, alternatively, the sealing layer 48 may be directly applied to the surface 62 of the mold 60. The sealing layer 48 may be placed on the release layer 64 via electroplating or other forming method.

The plurality of microspheres 50 of the insulating layer 46 may be applied to the sealing layer 48 using one or more of the processes described above and as generally referenced by arrow and reference numeral 80. A bonding layer 49 may be deposited on the insulating layer 46 by coating the insulating layer 46 or may be a preformed metallic foil layer applied thereon. It is also contemplated that the bonding layer 49 may not be applied to the insulating layer 46.

A first heating process, such as high temperature sintering, may be applied to the insulating layer 46 and/or the bonding layer 49 to bond the bonding layer 49 with the insulating layer 46 and with the sealing layer 48 as is generally referenced by arrow and reference numeral 82. It is understood that the bonding layer 49 may be applied prior to application of the first heating process or may be applied to the insulating layer 46 after application of the first heating process to form coating 16.

The coating 16 may be cast and/or applied to the surface 42 of substrate 40 of the component. A second heating process is applied to create bonds between the insulating layer 46, sealing layer 48 and/or bonding layer 49 at low temperatures by promoting low temperature diffusion bonding to adhere the layers of the coating 16 to the surface 42 of the substrate 40 of the component 14. Alternatively, the casting process may be used to cast the substrate 40 on to the bonding layer 49 of the coating 16 to adhere the coating 16 to the surface 42 of the substrate 40.

Figure 5D:
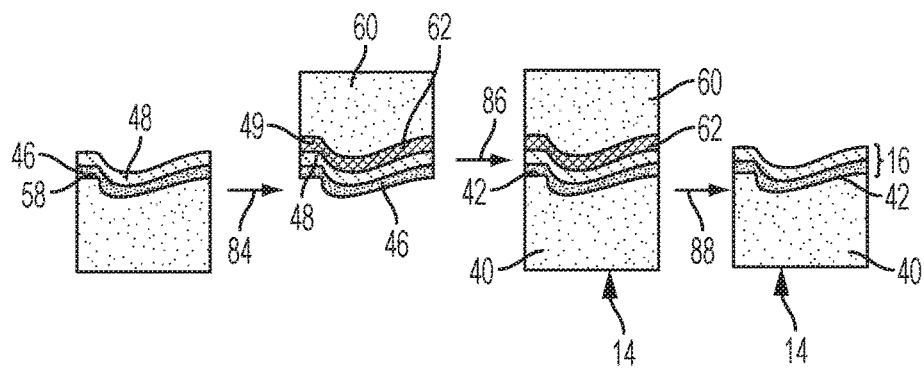

Referring now to FIG. 5D, another method of applying the coating 16 to a component 14 of the internal combustion engine 12 is described. A preformed bonding layer 49 may be applied to a support surface 58. The plurality of microspheres 50 of the insulating layer 46 may be applied to the bonding layer 49 on the support surface 58 or may be directly applied to the support surface 58 without the use of a bonding layer 49. A first heating process is applied to the insulating layer 46 and bonding layer 49 whereby the layers are sintered at high temperature to bond the insulating layer 46 to the bonding layer 49 to create the coating 16 as is generally referenced by arrow and reference numeral 84.

Sealing layer 48 may then be applied to the insulating layer 46 to seal the porosity in the insulating layer 46. It is contemplated that the sealing layer 48 may be applied to the insulating layer 46 prior to application of the first heating process to be sintered with the insulating layer 46 and bonding layer 49 or may applied after sintering of the insulating layer 46 and bonding layer 49.

A casting mold 60 is provided to receive the coating 16. The coating 16 may be applied directly to a surface 62 of the casting mold 60. Alternatively, a release layer 64 may be placed on surface 62 of the casting mold 60 to receive the coating 16 thereon. The component 14 cooperates with the casting mold 60 such that the coating 16 may be applied to the surface 42 of the substrate 40 of the component 14 as generally referenced by arrow and reference numeral 86 to form the component 14 with a coating 16 disposed thereon as generally referenced by arrow and reference numeral 88.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A method of forming a coating for use on a component of an internal combustion engine comprising:
   providing a template having a support surface;
   placing a bonding layer on the support surface of the template;
   applying an insulating layer on the bonding layer such that the bonding layer is disposed between the support surface and the insulating layer;
   heating the insulating layer and the bonding layer with a first heating process to bond the bonding layer and the insulating layer to form the coating;
   removing the coating from the support surface of the template;
   applying the coating to a surface of a substrate of the component; and
   applying a sealing layer to the insulating layer, wherein the insulating layer is disposed between the sealing layer and the bonding layer.

2. The method of claim 1 wherein the step of applying the coating to the surface of the substrate further comprises a second heating process to heat the coating and the surface of the substrate to promote low temperature diffusion bonding between the coating and the surface of the substrate.

3. The method of claim 1 wherein the step of applying the coating to the surface of the substrate further comprises:
   applying the coating to a surface of a casting mold; and
   casting the component in the casting mold so that the coating is attached to the surface of the substrate of the component.

4. The method of claim 3 further comprising the step of applying a release layer to the surface of the casting mold that is configured to receive the coating.

5. The method of claim 1 wherein the step of placing the bonding layer on the support surface further comprises placing a metallic foil bonding layer on the support surface.

6. The method of claim 1 wherein the step of placing the bonding layer on the support surface further comprises applying a coating of the bonding layer on the support surface.

7. A method of forming a coating for use on a component of an internal combustion engine comprising:
   providing a casting mold having a support surface;
   applying a release layer to the support surface of the casting mold;
   applying a sealing layer to the release layer;
   applying an insulating layer to the sealing layer such that the sealing layer is disposed between the release layer and the insulating layer;
   applying a bonding layer to the insulating layer, wherein the insulating layer is disposed between the sealing layer and the bonding layer;
   heating the bonding layer, insulating layer, the sealing layer and the release layer with a first heating process to bond the bonding layer with the insulating layer and the sealing layer to form the coating; and
   molding the coating to a surface of a substrate of the component to apply the coating to the substrate surface.

8. The method of claim 7 further comprising the step of applying a second heating process to the coating and the surface of the substrate to promote low temperature diffusion bonding between the bonding layer, the insulating layer and the sealing layer of the coating and the surface of the substrate.

9. The method of claim 7 wherein the release layer is disposed between the support surface of the casting mold and the sealing layer.

10. The method of claim 7 wherein the first heating process for the step of heating the insulating layer and sealing layer comprises high temperature sintering.

11. The method of claim 7 wherein the step of applying the sealing layer to the release layer further comprises applying the sealing layer via electroplating.

12. A method of applying a coating to a component of an internal combustion engine comprising:
providing a substrate having a presenting surface;
placing a bonding layer on the presenting surface;
applying an insulating layer on the bonding layer such that the bonding layer is disposed between the presenting surface and the insulating layer;
heating the insulating layer and the bonding layer with a heating process to form the coating on the support surface of the substrate; and
applying a sealing layer to the insulating layer, wherein the sealing layer is applied to a portion of the insulating layer such that the insulating layer is disposed between the sealing layer and the bonding layer.

13. The method of claim 12 wherein the step of applying the coating to the surface of the substrate further comprises heating the insulating layer and the bonding layer of the coating and the support surface of the substrate to promote low temperature diffusion bonding between the coating and the surface of the substrate.

14. The method of claim 12 wherein the step of placing the bonding layer on the support surface further comprises placing a metallic foil bonding layer on the support surface.

15. The method of claim 12 wherein the step of placing the bonding layer on the support surface further comprises applying the bonding layer with a slurry containing a plurality of microspheres on the support surface.

16. The method of claim 15 wherein the plurality of microspheres contained in the slurry of the bonding layer further comprise microspheres with a porosity of between about 80% and about 95%.

17. The method of claim 15 wherein the plurality of microspheres contained in the slurry of the bonding layer further comprise metallic microspheres.

18. The method of claim 15 wherein the plurality of microspheres contained in the slurry of the bonding layer further comprise ceramic microspheres having a diameter of about 10 microns to about 100 microns, preferably about 10 microns to about 50 microns.

19. The method of claim 15 wherein the slurry containing the plurality of microspheres of the bonding layer further comprises a matrix added to the plurality of microspheres, wherein the matrix contains particles having a weight fraction of about 5% by weight to about 50% by weight of the microspheres.

20. The method of claim 15 wherein the slurry containing the plurality of microspheres of the bonding layer further comprises at least one of a solvent and a binder added with the matrix and the plurality of microspheres.

* * * * *